Nov. 21, 1933.  J. R. GARRISON  1,936,551
COOKING UTENSIL
Filed July 11, 1932
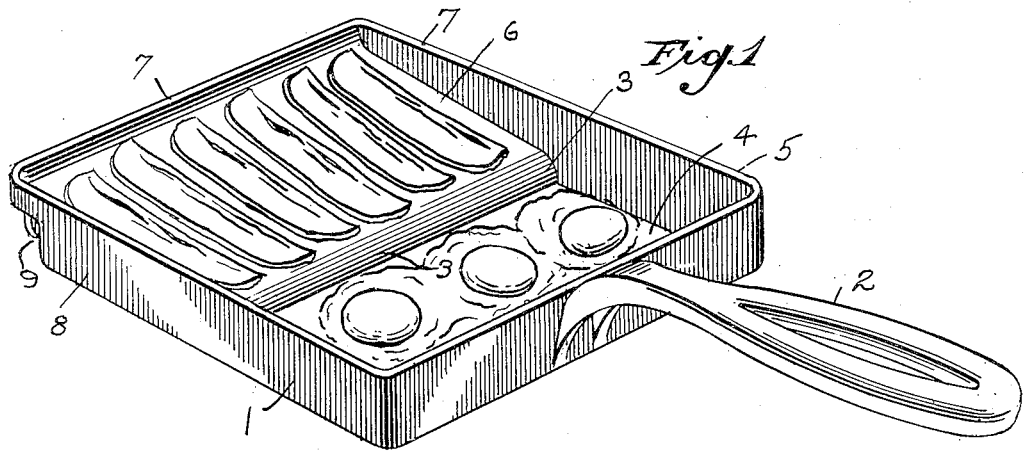
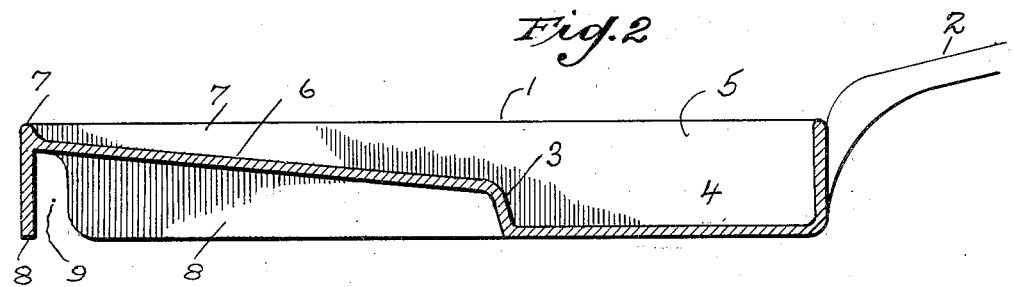
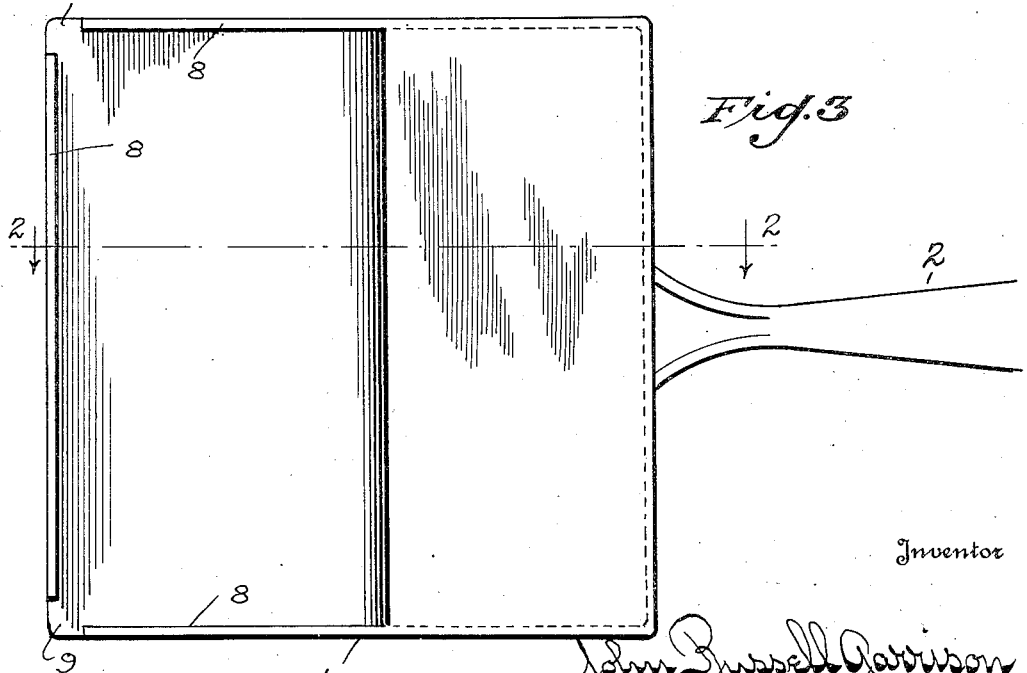

Patented Nov. 21, 1933

1,936,551

UNITED STATES PATENT OFFICE 1,936,551

COOKING UTENSIL

John Russell Garrison, Dayton, Ohio, assignor of one-half to Ralph P. Garrison, Dayton, Ohio Application July 11, 1932. Serial No. 621,831

11 Claims. (Cl. 53—7)

This invention relates to cooking utensils and more particularly to a skillet adapted for separately cooking dissimilar foods simultaneously, or for simultaneously subjecting different portions of similar foods to progressive cooking stages. The skillet is especially adapted for frying bacon and eggs, or ham and eggs but is obviously usable or other purposes.

To fry bacon dry and crisp, as it is preferred by many people, it is necessary to frequently drain off the rendered fat and not allow the bacon to cook in its grease. This is not practical when cooking in the usual type of skillet or frying pan. Beacon in time becomes somewhat strong or rancid. It has been found that the disagreeable flavor is contained to a considerable extent in the fat or grease. By draining off the rendered fat the strong flavor is to a very considerable extent minimized.

The present invention contemplates a skillet having means for automatically and constantly draining from the cooking bacon the rendered fat so that the grease does not accumulate about the bacon but is collected in a separate compartment where it is employed for frying eggs to which the addition of the fat is desirable and necessary. The device is further provided with means for confining the heated gases and products of combustion and circulating them beneath the cooking surface in such manner as to secure substantially uniform distribution of the heat to maintain equalized temperature throughout the cooking area.

The object of the invention is to provide an efficient utensil capable of being economically and cheaply manufactured which will enable different food portions to be cooked simultaneously under dissimilar conditions.

A further object of the invention is to provide a skillet or utensil for cooking bacon whereby the rendered fat will be uniformly and constantly drained away from the cooking area and which will enable the production of bacon uniformly dry and crisp.

A further object of the invention is to provide a utensil adapted for simultaneously cooking bacon and eggs or other like commodities whereby the supply of cooking fat or grease for the eggs is constantly replenished.

A further object of the invention is to provide means for insuring uniform distribution of the heated gases and products of combustion employed for cooking thus equalizing the temperature throughout the cooking surface.

With the above primary and other incidental objects in view as will more fully appear in the specification, invention consists of the features of construction, the parts and combinations thereof and the mode of operation or their equivalent as hereinafter described and set forth in the claims.

Referring to the accompanying drawing where is shown the preferred but obviously not necessarily the only form of embodiment of invention, Fig. 1 is a perspective view of the skillet forming the subject matter hereof. Fig. 2 is a transverse sectional view. Fig. 3 is a bottom plan view.

Like parts are indicated by separate characters of reference throughout the several views.

Referring to the accompanying drawing there is shown a cooking utensil or skillet 1, of substantially rectangular form having a handle 2 extending from one side thereof. The skillet 1 is transversely divided by an offset or "step" 3 extending transversely across the bottom of the skillet 1 from side to side and dividing it into a depressed area 4 having a substantially flat horizontal bottom having upstanding side walls 5, and an elevated cooking surface 6 inclined toward the depressed portion 4, on the opposite side of the offset or "step" 3. Marginal flanges 7 are provided about the inclined elevated portion 6 and beneath such portions there are provided dependent marginal flanges 8 which terminate in the plane of the bottom of the depressed portion 4, thus forming beneath the elevated inclined surface 6 an inverted recess or pocket within which are received the heated gases and products of combustion employed for cooking purposes. The dependent flanges 8 are interrupted at the higher corners of the inclined elevated cooking surface 6 to afford vents, 9, through which excess heated gases and products of combustions are discharged. The location of the vents 9 at the higher side of the cooking surface 6, and coincident with the corners of the rectangular body insures a circulation of heated gases and products of combustion to the extreme corners of the cooking surface thus equalizing the cooking temperature.

In using the utensil the bacon is laid upon the elevated inclined portion 6. As the bacon fat is rendered, the grease drains automatically down the inclined surface 6, and is discharged over the offset 3 into the depressed area 4, in which the eggs are deposited, thus replenishing the grease in which the eggs are being cooked. The bacon and the eggs cook simultaneously. The grease is accumulated in the depressed portion 4, as rapidly as it is rendered, the bacon being continuously drained, will be uniformly cooked dry and crisp.

While primarily intended for cooking bacon and eggs as described, it is obvious that potatoes may be cooked within the area 4, and subsequently transferred to the elevated inclined surface 6 to complete the cooking or browning while the grease is being drained from the potatoes back to the receptacle or reservoir 4 in which either another portion of potatoes or some other food item may be cooking. It may likewise be employed for cooking steak. One steak may be seared upon the elevated inclined area 6, while a second steak is being cooked within the area 4 to which the first steak will be later transferred, or vice versa the steaks may be initially prepared in the depressed area 4 and transferred to the area 6 for completion of the cooking operation. The skillet may be made from any suitable material, castiron, or cast aluminum being preferable. While in the form illustrated it is intended to be placed over a fire or heating element, it is quite obvious that electrical heating elements may, if desired, be incorporated directly within the utensil.

In lieu of forming the surface 6 as a single flat surface inclined in but one direction in skillets of larger sizes, such cooking area may comprise oppositely inclined areas of obtuse V shape either concave or convex, but elevated sufficiently above the depressed cooking area 4 to afford the offset 3 over which grease is drained by gravity from the elevated cooking area and confined in the depressed cooking area, to supply a commodity being cooked therein.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. A cooking skillet including two cooking compartments arranged at different levels, an offset transversely dividing the bottom of the skillet from side to side, a depressed cooking portion on one side of the offset, an elevated cooking portion inclined toward the depressed portion on the opposite side of the offset, and a dependent marginal flange about the elevated inclined portion, said flange being interrupted at spaced intervals.

2. A cooking skillet including an offset transversely dividing the bottom thereof from side to side, a flat elevated inclined cooking portion and a flat depressed cooking portion of approximately equal extent on opposite sides of the abrupt offset and interjoined thereby.

3. A rectangular cooking skillet including rectangular intercommunicating flat inclined elevated and depressed cooking portions of approximately equal extent, and an offset extending transversely across the skillet from one side to the other joining the elevated and depressed portions, in such relation that drainage from the elevated portion passes thereover into the depressed portion.

4. A cooking skillet of rectangular form having a depressed bottom portion and an elevated portion inclined toward the depressed portion, a dependent marginal flange about the elevated inclined portion having notches for escape of heated air substantially coincident with the higher corners of such inclined portion.

5. A cooking utensil comprising a skillet having a bottom, one part of which is elevated above the level of the other and inclined relative thereto, and a dependent flange about the elevated portion terminating substantially in the plane of the bottom of the remaining portion.

6. A cooking skillet including a bottom portion transversely divided into a substantially horizontal portion and an elevated portion of approximately equal extent inclined toward the horizontal portion, said inclined and horizontal portions being joined by an abrupt offset over which liquids will drain from the inclined portion to the horizontal portion.

7. A bacon and egg skillet including a depressed portion to receive eggs to be fried, and an inclined elevated portion to receive bacon to be fried, the inclined elevated portion discharging liquids into the depressed portion by gravity.

8. A substantially rectangular cooking skillet divided transversely into intercommunicating substantially flat elevated and depressed cooking portions of approximately equal extent interconnected by an abrupt offset extending substantially straight across the skillet and serving to confine within the depressed portion liquids drained from the elevated portion.

9. A cooking skillet having a depressed bottom portion and an elevated bottom portion and a dependent supporting flange about the elevated portion for confining and distributing throughout the area thereof heat for cooking purposes.

10. A cooking skillet having a depressed bottom portion and an elevated bottom portion and a dependent flange about the elevated portion and vents in said dependent flange for inducing a flow of heated air in predetermined directions beneath the elevated portion of the skillet.

11. A cooking skillet having a depressed bottom portion and an elevated bottom portion and a dependent flange about the elevated portion, said dependent flange having relatively spaced gaps for discharge of heated air from beneath the elevated portion and for inducing circulation of heated air to effect even distribution of cooking temperature.

JOHN RUSSELL GARRISON.